United States Patent
Ibuka et al.

(10) Patent No.: US 10,435,021 B2
(45) Date of Patent: Oct. 8, 2019

(54) VEHICLE CONTROL DEVICE

(71) Applicant: HONDA MOTOR CO., LTD., Minato-ku, Tokyo (JP)

(72) Inventors: Jun Ibuka, Wako (JP); Jun Tanaka, Wako (JP); Takuyuki Mukai, Wako (JP); Shigehiro Honda, Wako (JP); Riho Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 15/831,524

(22) Filed: Dec. 5, 2017

(65) Prior Publication Data

US 2018/0162396 A1 Jun. 14, 2018

(30) Foreign Application Priority Data

Dec. 8, 2016 (JP) .................. 2016-238711

(51) Int. Cl.
*B60W 30/12* (2006.01)
*G08G 1/16* (2006.01)
(Continued)

(52) U.S. Cl.
CPC .......... *B60W 30/12* (2013.01); *B60W 30/095* (2013.01); *B60W 30/10* (2013.01);
(Continued)

(58) Field of Classification Search
CPC .... B60W 30/12; B60W 30/095; B60W 30/10; B60W 30/18; G01C 21/3658; G05D 1/00;
(Continued)

(56) References Cited

U.S. PATENT DOCUMENTS 9,764,640 B2 * 9/2017 Matsuno ................ B60K 28/10
2016/0041553 A1 2/2016 Sato et al.
(Continued)

FOREIGN PATENT DOCUMENTS

JP 11-223531 8/1999
JP 2009-047491 3/2009
(Continued)

OTHER PUBLICATIONS

Japanese Office Action for Japanese Patent Application No. 2016-238711 dated Dec. 25, 2018.
(Continued)

*Primary Examiner* — Gertrude Arthur Jeanglaude
(74) *Attorney, Agent, or Firm* — Amin, Turocy & Watson LLP (57) ABSTRACT

A vehicle control device includes a lane determining unit which, in the event there is a branching path or a merging path in a planned travel route of a host vehicle, is adapted to determine whether or not a lane in which the host vehicle is traveling differs from a lane in which the branching path or the merging path exists, and a lane change instructing unit which, in the event it is determined by the lane determining unit that the lane in which the host vehicle is traveling differs from the lane in which the branching path or the merging path exists, is adapted to set a route so that the host vehicle automatically performs a lane change into the lane in which the branching path or the merging path exists.

9 Claims, 8 Drawing Sheets

(51) Int. Cl.
  *G05D 1/00* (2006.01)
  *G05D 1/02* (2006.01)
  *B60W 30/095* (2012.01)
  *B60W 30/10* (2006.01)
  *B60W 30/18* (2012.01)
  *G01C 21/36* (2006.01)
  *G08G 1/0967* (2006.01)
  *G08G 1/0968* (2006.01)

(52) U.S. Cl.
  CPC ......... *B60W 30/18* (2013.01); *G01C 21/3658* (2013.01); *G05D 1/0088* (2013.01); *G05D 1/0212* (2013.01); *G08G 1/096725* (2013.01); *G08G 1/096758* (2013.01); *G08G 1/096775* (2013.01); *G08G 1/096827* (2013.01); *G08G 1/096844* (2013.01); *G08G 1/167* (2013.01); *G05D 2201/0213* (2013.01)

(58) Field of Classification Search
  CPC ...... G05D 1/0088; G05D 1/02; G05D 1/0212; G05D 2201/0213; G08G 1/0967; G08G 1/0969; G08G 1/16; G08G 1/167

USPC ........................................................ 701/26
  See application file for complete search history.

(56) References Cited

U.S. PATENT DOCUMENTS

2017/0018189 A1 1/2017 Ishikawa
2017/0082452 A1 3/2017 Sumizawa
2017/0203770 A1 7/2017 Kondo

FOREIGN PATENT DOCUMENTS

| JP | 2015-184722 | 10/2015 |
| JP | 2016-038768 | 3/2016 |
| WO | 2015/190212 | 12/2015 |
| WO | 2016/013325 | 1/2016 |

OTHER PUBLICATIONS

Japanese Office Action for Japanese Patent Application No. 2016-238711 dated May 8, 2018.

\* cited by examiner

VEHICLE CONTROL DEVICE

CROSS-REFERENCE TO RELATED APPLICATION

This application is based upon and claims the benefit of priority from Japanese Patent Application No. 2016-238711 filed on Dec. 8, 2016, the contents of which are incorporated herein by reference.

BACKGROUND OF THE INVENTION

Field of the Invention

The present invention relates to a vehicle control device which at least partially carries out a travel control for a host vehicle by way of automated driving.

Description of the Related Art

In Japanese Laid-Open Patent Publication No. 11-223531, a problem is addressed of guiding a change in course toward a travel direction at a timing earlier than usual when a state of traffic congestion is occurring.

In order to solve this problem, according to Japanese Laid-Open Patent Publication No. 11-223531, the change in course is guided to a right side lane by a voice instruction given at a predetermined timing, when it is determined, on the basis of road map data from a CD-ROM and a current position of the vehicle determined based on radio wave signals received by a GPS antenna, that there is an intersection in front of the vehicle. Further, when it is detected by a VICS receiver that traffic congestion is occurring in the right lane prior to the intersection, the change in course to the right side lane is guided by hastening the predetermined timing. During traffic congestion, the change in course to the right side lane is guided at an earlier timing than usual. In paragraph [0020] of Japanese Laid-Open Patent Publication No. 11-223531, it is noted that the hastened timing may be of a length (time period) corresponding to a length of the detected traffic congestion.

SUMMARY OF THE INVENTION

In Japanese Laid-Open Patent Publication No. 11-223531, the change in course is guided by way of a voice instruction given to the driver at a timing of the change in course, using a technology assuming a case in which a vehicle that is traveling in the left lane changes course to the right lane prior to reaching the intersection, and thereafter, the vehicle turns to the right at the intersection.

Generally, the act of turning to the right at an intersection does not occur that frequently. However, opportunities for traveling on a branching path or a merging path can occur frequently on expressways and the like. In such a case, for example during automated driving, there is a concern that switching over to manual driving every time that a change in course is issued by way of a voice instruction could result in a loss of merchantability in relation to automated driving.

The present invention has been devised in order to solve the aforementioned problems, and has the object of providing a vehicle control device which is capable of enhancing merchantability in relation to automated driving, and can carry out a change in course while continuing with automated driving insofar as possible even before reaching a branching path or a merging path.

[1] A vehicle control device according to the present invention is characterized by automatically controlling traveling of a host vehicle at least partially, and comprises a lane determining unit which, in the event there is a branching path or a merging path in a planned travel route of the host vehicle, is adapted to determine whether or not a lane in which the host vehicle is traveling differs from a lane in which the branching path or the merging path exists, and a lane change instructing unit which, in the event it is determined by the lane determining unit that the lane in which the host vehicle is traveling differs from the lane in which the branching path or the merging path exists, is adapted to set a route so that the host vehicle automatically performs a lane change into the lane in which the branching path or the merging path exists.

In accordance with this feature, it is possible to enhance merchantability in relation to automated driving, as well as to carry out a lane change while continuing with automated driving insofar as possible, even before reaching the branching path or the merging path.

[2] In the present invention, the lane determining unit may perform the determination at a point in time when the host vehicle has reached a predetermined distance in front of the branching path or the merging path, or at a point in time when the host vehicle has reached a predetermined time period before a point in time at which the host vehicle reaches the branching path or the merging path.

In accordance with this feature, for example, in the case that traffic congestion has occurred in the branching path or the merging path, it is possible for the host vehicle to make a lane change beforehand into the lane in which the branching path or the merging path exists.

[3] In the present invention, the host vehicle may comprise a traffic congestion information receiving unit adapted to receive traffic congestion information by way of communications, and the lane determining unit may perform the determination when the traffic congestion information is updated.

In accordance with this feature, in the case that traffic congestion has occurred in the branching path or the merging path, it is possible for the host vehicle to make a lane change beforehand into the lane in which the branching path or the merging path exists. Of course, if no traffic congestion is occurring, automated driving may be continued in accordance with the preset action plan.

[4] In the present invention, the lane determining unit may perform the determination when the planned travel route of the host vehicle is changed.

In accordance with this feature, accompanying a change in the branching path or the merging path that was targeted, it is determined whether or not the lane in which the host vehicle is traveling differs from the lane in which the branching path or the merging path after having been changed exists. Stated otherwise, even if the planned travel route of the host vehicle is changed, the timing of the lane change is set appropriately in accordance with the change in the travel route, so that automated driving can be continued for a longer time, and merchantability in relation to automated driving can further be enhanced.

[5] In the present invention, for a case in which a travel lane and a passing lane exist in the planned travel route of the host vehicle, and the branching path is present in the planned travel route of the host vehicle, if it is determined that the host vehicle is traveling in the travel lane and the branching path exists in the passing lane, the lane determining unit may set an action plan for changing the lane of the host vehicle to the passing lane in the planned travel route, and may continue with automated driving.

In accordance with this feature, while the host vehicle is traveling in the travel lane, and for example, in the case that traffic congestion has occurred in front of the host vehicle in a branching path that exists on the side of the passing lane, it is possible for the host vehicle to make a lane change beforehand into the passing lane.

[6] In the present invention, the host vehicle may include a traffic congestion information receiving unit adapted to receive traffic congestion information by way of communications, and the lane determining unit may comprise a vehicle control unit adapted to automatically control the host vehicle so as to behave in a manner to facilitate lane changing, at a point in time when the host vehicle has reached a predetermined distance in front of the branching path or the merging path, or at a point in time when the host vehicle has reached a predetermined time period before a point in time at which the host vehicle reaches the branching path or the merging path, and in the case it is predicted by the traffic congestion information receiving unit that the branching path or the merging path is in a congested state.

In accordance with this feature, by the automated driving behavior being conducted in a manner to facilitate lane changing, it is possible to easily perform a lane change automatically, prior to reaching a location where traffic congestion is occurring.

[7] In the present invention, in the case it is predicted that the branching path or the merging path is in a congested state, the vehicle control unit may decrease or increase any one of a vehicle velocity, an acceleration, a deceleration, and a steering amount of the host vehicle, as compared with a condition thereof prior to predicting the congested state.

In accordance with this feature, it becomes easier to make a lane change, and to facilitate stopping at the tail end of the traffic congestion after having made the lane change. The reason why the term "increase" is included is because it may be easier in certain cases to make a change by accelerating or the like.

[8] In the present invention, there may further be provided a road departure mitigation control unit adapted to perform a road departure mitigation control for suppressing departure of the host vehicle from the road, at least when the host vehicle is made to undergo automated traveling along the road, and the host vehicle may include a traffic congestion information receiving unit adapted to receive traffic congestion information by way of communications, wherein, at a point in time when the host vehicle has reached a predetermined distance in front of the branching path or the merging path, or at a point in time when the host vehicle has reached a predetermined time period before a point in time at which the host vehicle reaches the branching path or the merging path, and in the case it is determined by the lane determining unit, on the basis of the information received by the traffic congestion information receiving unit, that a traffic congestion distance is longer than a length of the branching path or the merging path, the road departure mitigation control by the road departure mitigation control unit may be alleviated.

In the event that the distance over which traffic congestion is occurring in the branching path or the merging path is long, it is conceivable that the congested vehicles within the branching path or the merging path cannot be accommodated therein, and thus the vehicles overflow and become congested in the normal travel lane. In such a situation, it is normal for several vehicles to remain waiting for the traffic congestion in proximity to a road shoulder area of the travel path. However, in the case of automated driving, basically a control is performed to travel in the vicinity of the center of the lane, and in accordance with a road departure mitigation control, the vehicle is controlled so as not to deviate outside of the lane.

Therefore, in the above-described scenario, concerning a case in which the host vehicle is also at the tail end of the traffic congestion, there is a fear that the host vehicle will remain waiting for the traffic congestion in the center of the lane, and thereby hinder the traffic behind the host vehicle from traveling straight ahead. Thus, in such a case, the road departure mitigation control may be alleviated, and thereby allow the vehicle to be brought in proximity to the side of the road shoulder. Consequently, it becomes possible to wait for the traffic congestion without hindering the traffic behind the host vehicle.

[9] In the present invention, there may further be provided a travel route setting unit adapted to set a travel route of the host vehicle, and a traffic congestion information receiving unit adapted to receive traffic congestion information by way of communications, wherein, at a point in time when the host vehicle has reached a predetermined distance in front of the branching path or the merging path, or at a point in time when the host vehicle has reached a predetermined time period before a point in time at which the host vehicle reaches the branching path or the merging path, and in the case it is determined by the lane determining unit, on the basis of the information received by the traffic congestion information receiving unit, that a traffic congestion distance is longer than a length of the branching path or the merging path, the travel route setting unit may change the travel route so as to avoid the branching path or the merging path.

In this case, since a special automated driving control to have the vehicle be brought into proximity to the road shoulder is not performed, it is possible to avoid a scenario in which it becomes difficult to execute automated driving, and thus continuing with automated driving is facilitated.

According to the present invention, it is possible to enhance merchantability in relation to automated driving, as well as to carry out a change in course while continuing with automated driving insofar as possible, even before reaching a branching path or a merging path.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

An exemplary embodiment of a vehicle control device according to the present invention will be presented and described in detail below with reference to FIGS. 1 through 8B.

Figure 1:
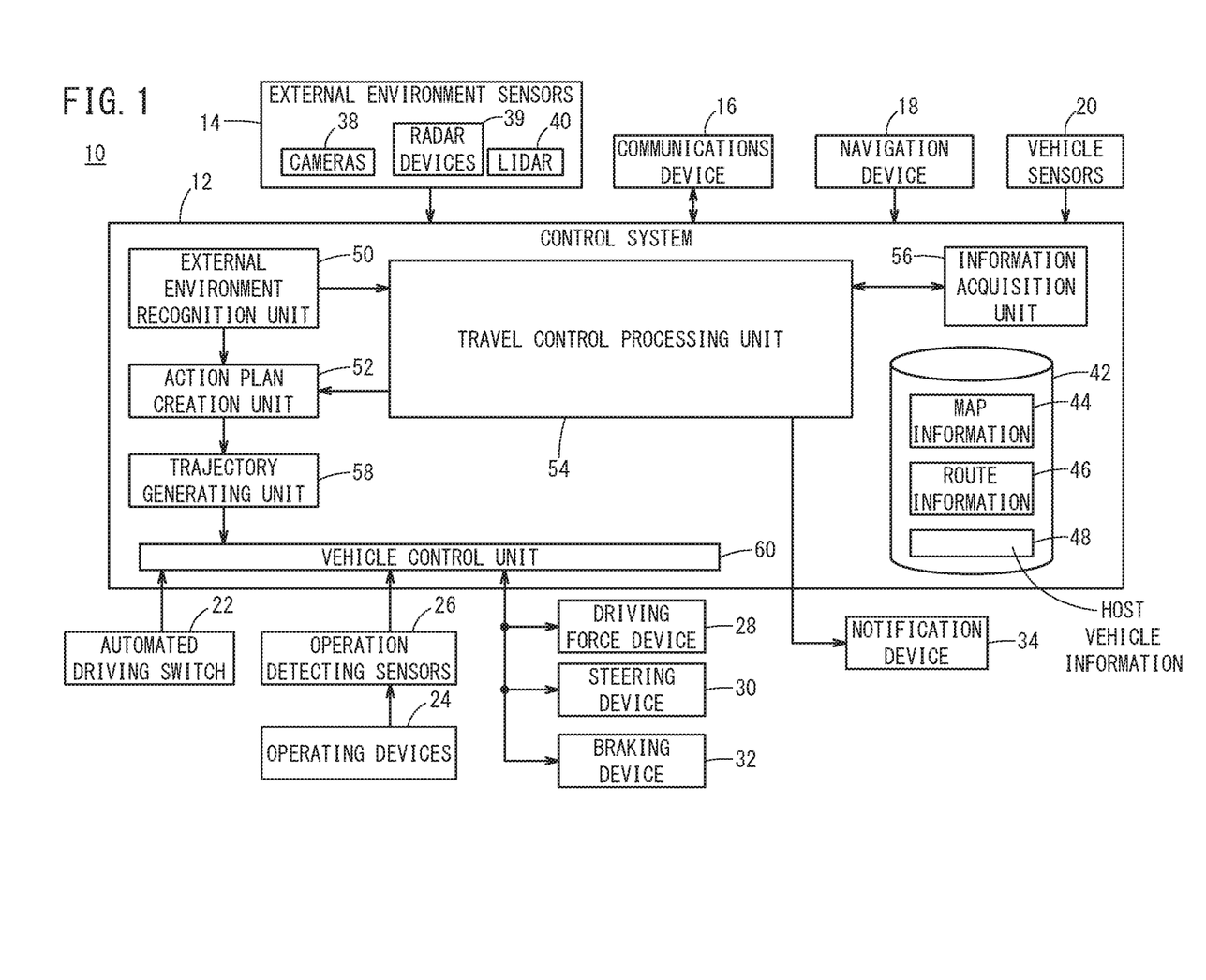
FIG. 1 is a block diagram showing a configuration of a host vehicle including a travel electronic control unit serving as a vehicle control device according to an embodiment of the present invention.

FIG. 1 is a block diagram showing a configuration of a vehicle including a travel electronic control unit serving as a vehicle control device 10 according to an embodiment of the present invention.

The vehicle control device 10 is incorporated in the driver's own vehicle 100 (hereinafter referred to as a host vehicle 100), and performs a travel control for the vehicle by way of automated driving or manual driving. In this case, the term "automated driving" implies a concept that includes not only "fully automated driving" in which the travel control for the vehicle is performed entirely automatically, but also "partial automated driving" in which the travel control is partially performed automatically.

The vehicle control device 10 is basically made up from an input system device group, a control system 12, and an output system device group. The respective devices of the input system device group and the output system device group are connected via communication lines to the control system 12.

The input system device group includes external environment sensors 14, a communications device 16, a navigation device 18, vehicle sensors 20, an automated driving switch 22, and operation detecting sensors 26 connected to operating devices 24.

The output system group includes a driving force device 28 for driving the vehicle wheels (not shown), a steering device 30 for steering the vehicle wheels, a braking device 32 for braking the vehicle wheels, and a notification device 34 (notification unit) for notifying the driver primarily through visual and auditory sensation.

The external environment sensors 14 acquire information (hereinafter referred to as external environmental information) indicative of the state of the external environment around the vehicle, and output the acquired external environmental information to the control system 12. More specifically, the external environment sensors 14 are configured to include a plurality of cameras 38, a plurality of radar devices 39, and a plurality of LIDAR devices 40 (Light Detection and Ranging; Laser Imaging Detection and Ranging).

The communications device 16 is configured to be capable of communicating with external devices including roadside devices, other vehicles, and a server, and transmits and receives, for example, information related to transportation facilities, information related to other vehicles, probe information (including traffic congestion information), and the most recent map information 44, etc. The map information 44 is stored in a predetermined memory area of the storage device 42, or alternatively, in the navigation device 18.

The navigation device 18 is constituted to include a satellite positioning device, which is capable of detecting a current position of the vehicle, and a user interface (for example, a touch-panel display, a speaker, and a microphone). Based on the current position of the vehicle or a position designated by the user, the navigation device 18 calculates a route to a designated destination point, and outputs the route to the control system 12. The route calculated by the navigation device 18 is stored as planned travel route information 46 in a predetermined memory area of the storage device 42.

The vehicle sensors 20 output to the control system 12 detection signals from respective sensors, including a speed sensor for detecting the travel speed V (vehicle velocity), an acceleration sensor for detecting an acceleration, a lateral G sensor for detecting a lateral G force, a yaw rate sensor for detecting an angular velocity about a vertical axis, an orientation sensor for detecting an orientation, and a gradient sensor for detecting a gradient of the vehicle. The detection signals are stored as host vehicle information 48 in a predetermined memory area of the storage device 42.

The automated driving switch 22, for example, is a pushbutton switch provided on the instrument panel. The automated driving switch 22 is configured to be capable of switching between a plurality of driving modes, by manual operation thereof by a user including the driver.

The operating devices 24 include an accelerator pedal, a steering wheel, a brake pedal, a shift lever, and a direction indication (turn signal) lever. The operation detecting sensors 26, which detect the presence or absence or the operated amounts of operations made by the driver, as well as operated positions, are attached to the operating devices 24.

The operation detecting sensors 26 output to the vehicle control unit 60 as detection results an amount by which the accelerator pedal is depressed (degree of accelerator opening), an amount (steering amount) by which the steering wheel is operated, an amount by which the brake pedal is depressed, a shift position, and a right or left turn direction, etc.

The driving force device 28 is constituted from a driving force ECU (Electronic Control Unit), and a drive source including an engine and/or a driving motor. The driving force device 28 generates a travel driving force (torque) for the vehicle in accordance with vehicle control values input thereto from the vehicle control unit 60, and transmits the travel driving force to the vehicle wheels directly or through a transmission.

The steering device 30 is constituted from an EPS (electric power steering system) ECU, and an EPS device. The steering device 30 changes the orientation of the wheels (steered wheels) in accordance with vehicle control values input thereto from the vehicle control unit 60.

The braking device 32, for example, is an electric servo brake used in combination with a hydraulic brake, and is made up from a brake ECU and a brake actuator. The braking device 32 brakes the vehicle wheels in accordance with vehicle control values input thereto from the vehicle control unit 60.

The notification device 34 is made up from a notification ECU, a display device, and an audio device. The notification device 34 performs a notifying operation in relation to automated driving or manual driving (including a takeover request TOR, to be described later), in accordance with a notification command output from the control system 12 (and more specifically, a travel control processing unit 54 thereof).

In this instance, an "automated driving mode" and a "manual driving mode" (non-automated driving mode) are switched sequentially each time that the automatic driving switch 22 is pressed. Instead of this feature, in order to provide confirmation of a driver's intention, it is possible to provide settings in which, for example, switching from the manual driving mode to the automated driving mode is effected by pressing twice, and switching from the automated driving mode to the manual driving mode is effected by pressing once.

The automated driving mode is a driving mode in which the vehicle travels under the control of the control system 12 while the driver does not operate the operating devices 24 (specifically, the accelerator pedal, the steering wheel, and the brake pedal). Stated otherwise, in the automated driving mode, the control system 12 controls a portion or all of the driving force device 28, the steering device 30, and the braking device 32 in accordance with sequentially created action plans.

When the driver performs a predetermined operation using the operating devices 24 during implementation of the automated driving mode, the automated driving mode is canceled automatically, together with switching to a driving mode (which may include the manual driving mode) in which the level of driving automation is relatively low. Hereinafter, an operation in which the driver operates the automated driving switch 22 or any of the operating devices 24 in order to transition from automated driving to manual driving will also be referred to as a "takeover operation".

The control system 12 is constituted by one or a plurality of ECUs, and comprises various function realizing units in addition to the aforementioned storage device 42. According to the present embodiment, the function realizing units are software-based functional units, in which the functions thereof are realized by a CPU (central processing unit) executing programs stored in the storage device 42. However, the functions thereof can also be realized by hardware-based functional units made up from integrated circuits such as a field-programmable gate array (FPGA) or the like.

In addition to the storage device 42 and the vehicle control unit 60, the control system 12 is configured to include an external environment recognition unit 50, an action plan creation unit 52, a travel control processing unit 54, an information acquisition unit 56, and a trajectory generating unit 58.

Using various information input thereto from the input system device group (for example, external environment information from the external environment sensors 14), the external environment recognition unit 50 recognizes lane markings (white lines) on both sides of the vehicle, and generates "static" external environment recognition information, including location information of stop lines and traffic signals, or travel enabled regions in which traveling is possible. Further, using the various information input thereto, the external environment recognition unit 50 generates "dynamic" external environment recognition information, including information concerning obstacles such as parked or stopped vehicles, traffic participants such as people and other vehicles, and the colors of traffic signals.

On the basis of recognition results from the external environment recognition unit 50, the action plan creation unit 52 creates action plans (a time series of events) for each of respective travel segments, and updates the action plans as needed. As types of events, for example, there may be cited events in relation to deceleration, acceleration, branching, merging, lane keeping, lane changing, passing other vehicles, and a road departure mitigation control. In this instance, "deceleration" and "acceleration" are events in which the vehicle is made to decelerate or accelerate. "Branching" and "merging" are events in which the vehicle is made to travel smoothly at a branching point or a merging point. "Lane changing" is an event in which the travel lane of the vehicle is made to change. "Passing" is an event in which the vehicle is made to overtake a preceding vehicle.

Further, "lane keeping" is an event in which the vehicle is made to travel without departing from the travel lane, and is subdivided into a combination of travel modes. More specifically, as such travel modes, there may be included constant speed traveling, follow-on traveling, traveling while decelerating, traveling through a curve, or traveling to avoid obstacles. The "road departure mitigation control" recognizes a lane with a monocular camera, prompts the attention of the driver by a display and a vibration applied to the steering wheel when the vehicle is about to go outside of the lane, and in the case that an avoidance operation is not being performed, provides an assist to control the steering and restore the vehicle into the lane. Further, if it is predicted that a large amount of lane deviation is likely to occur, braking is also controlled to suppress the deviation.

Using the map information 44, the planned travel route information 46, and the host vehicle information 48, which are read in from the storage device 42, the trajectory generating unit 58 calculates a travel trajectory (a time series of target behaviors) in accordance with the action plan created by the action plan creation unit 52. More specifically, the travel trajectory is a time series data set, in which the data units thereof are defined by a position, a posture angle, a velocity, an acceleration, a curvature, a yaw rate, and a steering angle.

The vehicle control unit 60 determines respective vehicle control values in order to control traveling of the vehicle, in accordance with the travel trajectory (time series of target behaviors) generated by the trajectory generating unit 58. In addition, the vehicle control unit 60 outputs the obtained vehicle control values, respectively, to the driving force device 28, the steering device 30, and the braking device 32.

The information acquisition unit 56 acquires information necessary for the process of determining conditions (hereinafter referred to as environmental conditions) in relation to the travel environment of the vehicle. As detailed examples of such necessary information, there may be cited time information (for example, the current time, the time zone, an expected arrival time), geographic information (for example, latitude, longitude, altitude, topography, differences in elevation), and weather information (for example, the weather, temperature, humidity, forecast information).

Figure 2:
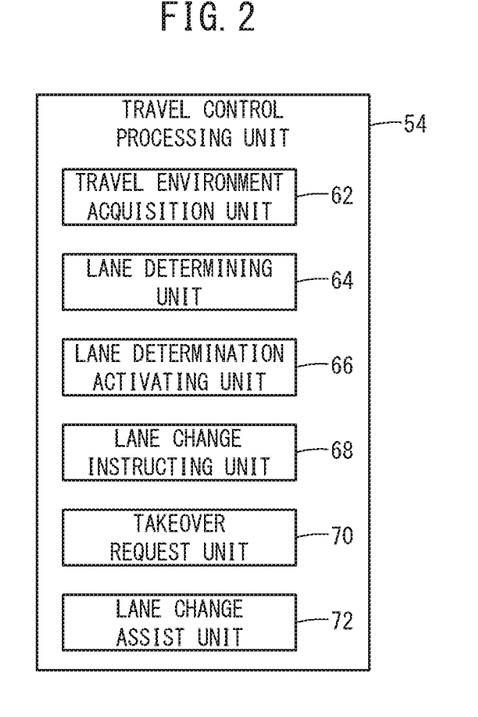
FIG. 2 is a block diagram showing a travel control processing unit.

On the other hand, the travel control processing unit 54 performs a process of transitioning between driving modes, and outputs signals to the action plan creation unit 52 and the notification device 34. More specifically, as shown in FIG. 2, the travel control processing unit 54 includes as functions thereof a travel environment acquisition unit 62, a lane determining unit 64, a lane determination activating unit 66, a lane change instructing unit 68, a takeover request unit 70, and a lane change assist unit 72.

The travel environment acquisition unit 62 acquires information concerning the travel environment of the host vehicle 100. Within the travel environment, there are included the most recent recognition results by the external environment recognition unit 50, or acquired information (for example, the aforementioned time information, geographical information, and weather information) from the information acquisition unit 56.

In the event there is a branching path or a merging path for which entry therein is planned up ahead in the planned travel route of the host vehicle 100 as indicated by the planned travel route information 46, the lane determining unit 64 determines whether the lane in which the host vehicle 100 is traveling differs from the lane in which the branching path or the merging path that the host vehicle 100 is scheduled to enter exists (lane determination).

Figure 3:
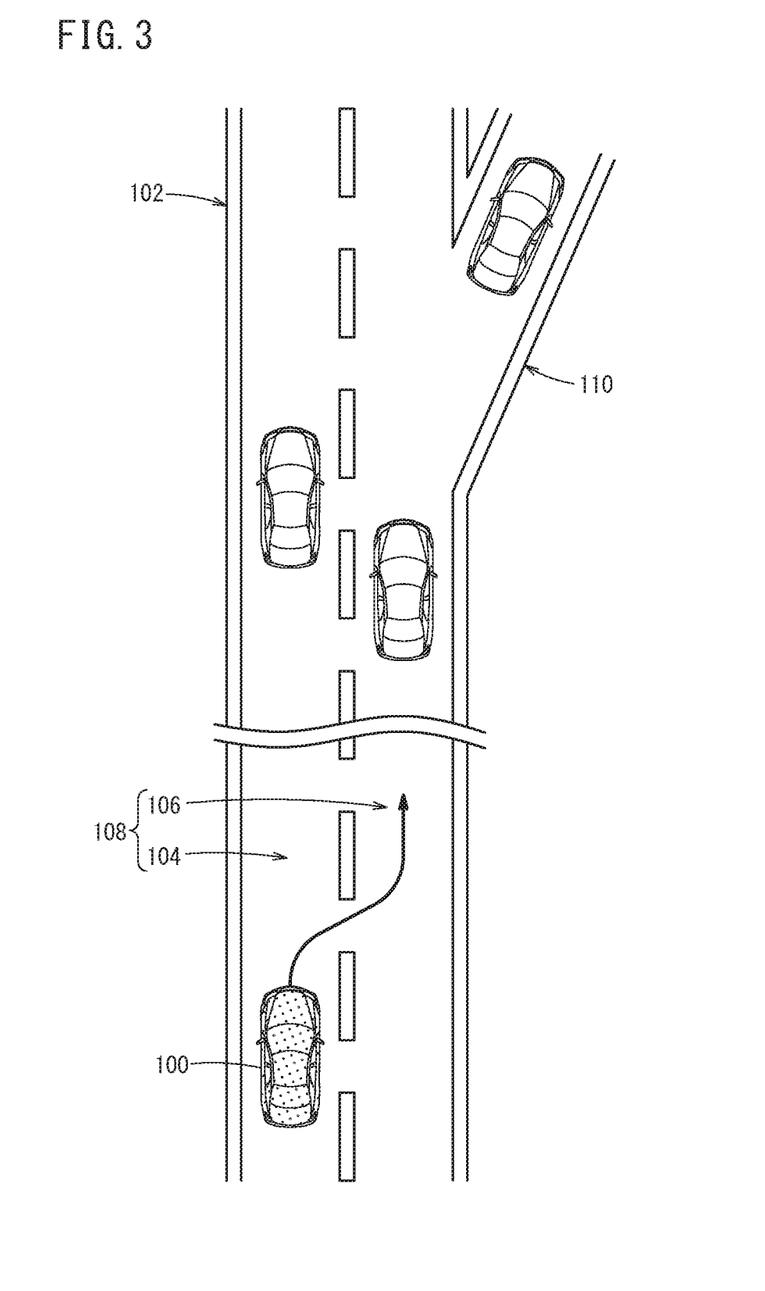
FIG. 3 is an explanatory diagram showing an example in which a branching path exists on the side of a passing lane, from within a main line of an expressway having both a travel lane and a passing lane.

Concerning the branching path 110, for example as shown in FIG. 3, a case will be assumed in which a main line 108 of an expressway, which includes, for example, a travel lane 104 and a passing lane 106, is present in the planned travel route 102, and within the main line 108, the branching path 110 exists on the side of the passing lane 106. In this example, in the case that the host vehicle 100 is traveling in the travel lane 104 of the main line 108, the lane in which the host vehicle 100 is traveling and the lane in which the branching path 110 exists are determined to be different.

Figure 4:
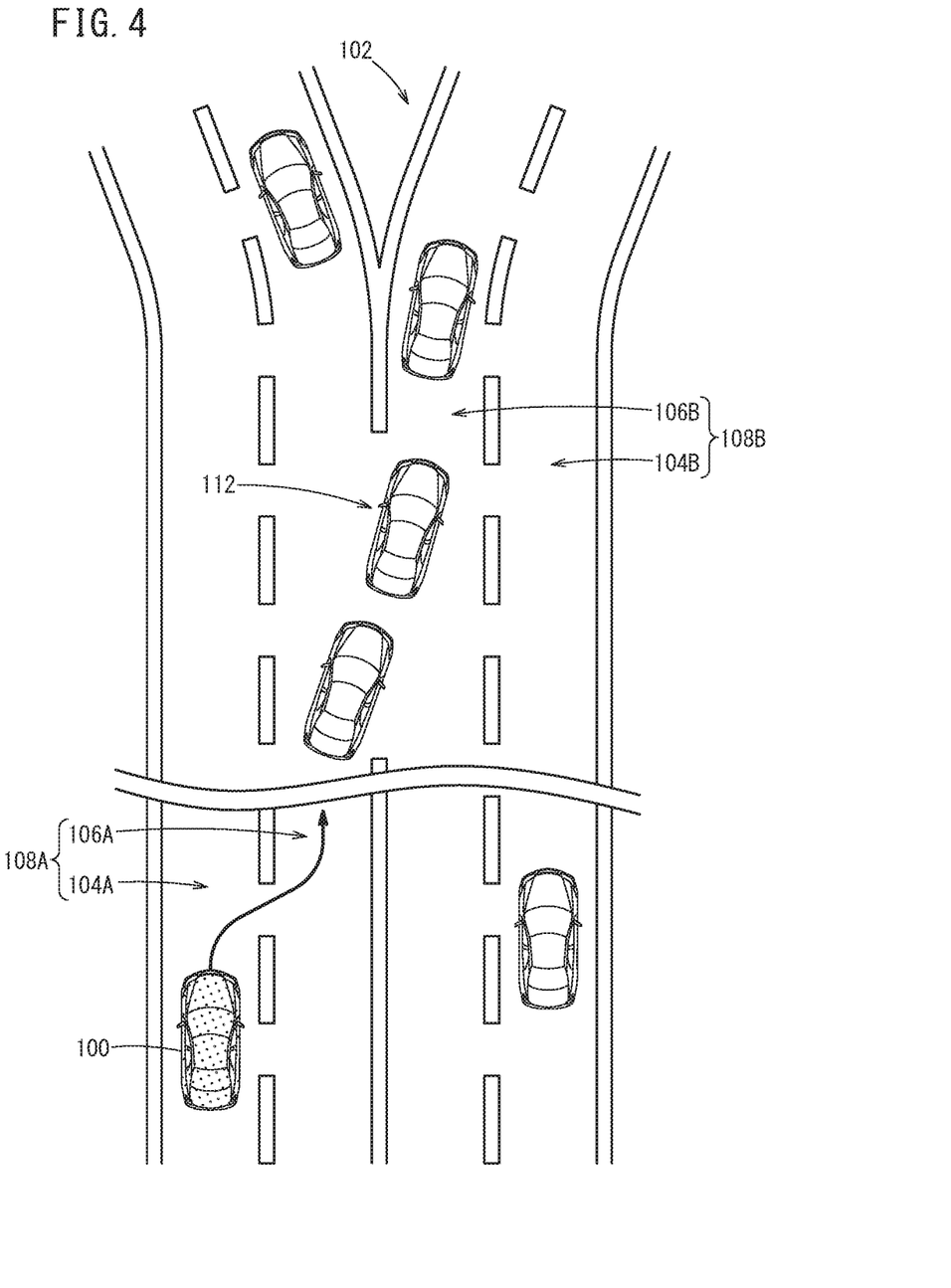
FIG. 4 is an explanatory diagram showing an example in which a merging path exists on the side of a passing lane, from within a main line of an expressway having both a travel lane and a passing lane.

Concerning the merging path 112, for example as shown in FIG. 4, a case will be assumed in which, in the planned travel route 102, a first main line 108A of an expressway, which includes, for example, a first travel lane 104A and a first passing lane 106A, and a second main line 108B of an expressway, which includes, for example, a second travel lane 104B and a second passing lane 106B, are arranged substantially in parallel with each other, and among the lanes, the merging path 112 exists on a side of the first passing lane 106A of the first main line 108A. In this example, in the case that the host vehicle 100 is traveling in the first travel lane 104A of the first main line 108A, the lane in which the host vehicle 100 is traveling and the lane in which the merging path 112 exists are determined to be different.

In either of these cases, it may be assumed that the lane in which the host vehicle 100 is traveling does not come to an end at the location of the branching path 110 or the merging path 112. Stated otherwise, at a time when there is no traffic congestion, branching or merging is possible by making a lane change immediately prior to branching or immediately prior to merging. However, during a time when there is traffic congestion, other vehicles are crowded in close formation and the space for entry therebetween is sparse, so there is a possibility that it may not be possible to make a lane change immediately prior to the branching path 110 or the merging path 112. As a result, there is no option but to go past the branching path 110 or the merging path 112. This is also because the travel lane 104 itself does not come to an end. In other words, if the lane were to terminate, it would not be necessary to change lanes, and even if there were traffic congestion, it would be possible to stop at the tail end of such traffic congestion.

The lane determination activating unit 66 initiates the lane determining unit 64 in accordance with a timing of the following points in time and cases (a) to (e), for example, and thereby causes the aforementioned lane determination to be executed.

(a) A point in time when the host vehicle 100 has reached a predetermined distance in front of the branching path 110 or the merging path 112 for which entry therein is planned.

(b) A point in time when the host vehicle 100 has reached a predetermined time period before a point in time at which the host vehicle 100 reaches the branching path 110 or the merging path 112 for which entry therein is planned.

(c) A point in time when the traffic congestion information received via the communications device 16 is updated.

(d) A point in time when the planned travel route 102 for the host vehicle 100 (in particular, the branching path 110 or the merging path 112 for which entry therein is planned) is changed.

(e) In the case of acquiring statistical information of a location of traffic congestion, which is received through the communications device 16, and on the basis of such statistical information, traffic congestion is expected to be taking place in the branching path 110 or the merging path 112 for which entry therein is planned.

If the determination result by the lane determining unit 64 is a determination result indicating a lane change, and more specifically, in the case that the lane in which the branching path 110 or the merging path 112 exists differs from the lane in which the host vehicle 100 is traveling, the lane change instructing unit 68 is activated and issues an instruction to execute a lane change. More specifically, a route is set so that the host vehicle 100 makes a lane change by way of automated driving into the lane in which the branching path 110 or the merging path 112 exists. For example, information for causing the host vehicle 100 to make a lane change into the lane in which the branching path 110 or the merging path 112 exists is output to the action plan creation unit 52. Consequently, the steering device 30, the braking device 32, etc., are controlled via the vehicle control unit 60, and the host vehicle 100 is operated to make a lane change by way of automated driving into the lane in which the branching path 110 or the merging path 112 exists.

If the determination result by the lane determining unit 64 is a determination result indicating a lane change, the takeover request unit 70 is activated prior to the lane change instructing unit 68, and in the case that it is difficult to perform the lane change by way of a travel assist action, the takeover request unit 70 performs a request operation to request that the driver take over the responsibility for driving manually. In accordance with this feature, responsive to the request operation (notification command) from the takeover request unit 70, the notification device 34 issues a notification to the effect that the driver should take over the responsibility for driving. The series of operations from the request operation to the notification operation is referred to as a "TOR" (takeover request).

Cases in which it is difficult to make a lane change by way of a driving assist action may include the following cases, for example.

(i) The distance from the host vehicle 100 to the branching path 110 or the merging path 112 for which entry therein is planned is short (e.g., less than 30 m).

(ii) A case in which it is anticipated that traffic congestion will be occurring in the branching path 110 or the merging path 112 at a point in time when the host vehicle 100 has reached a predetermined distance in front of the branching path 110 or the merging path 112.

(iii) A case in which it is anticipated that traffic congestion will be occurring in the branching path 110 or the merging path 112 at a point in time when the host vehicle 100 has reached a predetermined time period before a point in time at which the host vehicle 100 reaches the branching path 110 or the merging path 112.

If it is difficult to make a lane change by way of a driving assist action in the manner described above, the lane change assist unit 72 controls the host vehicle 100 so as to behave (vehicle speed, steering angle, etc.) in a manner to facilitate changing lanes prior to making the lane change.

More specifically, for example, information for carrying out any one of the following actions (1) to (3) is output to the action plan creation unit 52.

(1) The target vehicle speed is decreased by a predetermined value from a predetermined distance in front of (or a predetermined time period before) the location where traffic congestion is predicted to be occurring. This facilitates stopping at the tail end of the traffic congestion after having made the lane change.

(2) A steering angle restriction of the target steering angle is relaxed more so than in a normal state. Ordinarily, during automated driving, the maximum steering angle is limited. However, by relaxing the limitation on the maximum steering angle temporarily when the lane change is made, it becomes easier to stop at the tail end of the traffic congestion after having made the lane change.

(3) The target vehicle speed at the time of making the lane change is increased more than usual, or the vehicle is accelerated by an acceleration control. This also facilitates making the lane change.

Next, processing operations of the vehicle control device 10 according to the present embodiment will be described with reference to FIG. 5.

First, in step S1, the travel control processing unit 54 determines whether or not the automated driving mode is turned "ON". If the automated driving mode is not on, or in other words, if manual driving is being performed (step S1: NO), the process proceeds to step S2, and the vehicle control device 10 continues with manual driving of the host vehicle 100, and then returns to step S1 after a certain period of time has elapsed. On the other hand, in the case it is determined that the automated driving mode is in effect, or in other words, if the host vehicle 100 is traveling on the basis of an action plan (step S1: YES), the process proceeds to step S3.

In step S3, the lane determination activating unit 66 obtains information for the purpose of carrying out the lane determination. As such information, there may be included the current position of the host vehicle 100, the positions of branching paths 110 or merging paths 112 to be entered, the vehicle speed of the host vehicle 100, the presence or absence of an update to the traffic congestion information, the presence or absence of a change in the planned travel route 102, and statistical information concerning locations where traffic congestion is occurring, etc. As statistical information of the locations where traffic congestion is occurring, for example, there may be included traffic congestion conditions in branching paths 110 or merging paths 112 according to the time period (season, month, etc.) and time zone.

In step S4, on the basis of the various acquired information, the lane determination activating unit 66 determines whether the current time corresponds to any of the timings (a) to (e) mentioned above for which the lane determining unit 64 should be activated.

If the current time is determined to correspond in this manner (step S4: YES), the process proceeds to step S5, and the lane determination activating unit 66 activates the lane determining unit 64. The lane determining unit 64 determines whether or not the lane in which the host vehicle 100 is traveling differs from the lane in which the branching path 110 or the merging path 112 for which entry therein is planned exists.

In the case that the lanes differ from each other (step S6: YES), first, in step S7, the takeover request unit 70 determines whether or not it will be difficult to make the lane change by way of a driving assist action. This determination is made based on whether or not any of the aforementioned items (i) through (iii) are applicable.

If the lane change is determined not to be difficult (step S7: NO), the process proceeds to step S8, and the lane change instructing unit 68 issues an instruction to perform the lane change. For example, the lane change instructing unit 68 outputs to the action plan creation unit 52 information for causing the host vehicle 100 to make a lane change into the lane in which the branching path 110 or the merging path 112 for which entry therein is planned exists.

Thereafter, in step S9, the lane change is performed by way of automated driving. More specifically, for example, the braking device 32 or the like is controlled via the vehicle control unit 60, and the host vehicle 100 is operated to make a lane change into the lane in which the branching path 110 or the merging path 112 exists. At this time, an assist by the lane change assist unit 72 in accordance with the aforementioned items (1) through (3) is also implemented.

Thereafter, in step S10, the travel control processing unit 54 determines whether or not the lane change has been completed. If the lane change has not been completed (step S10: NO), the process returns to step S9, and step S9 and the steps subsequent thereto are repeated. If it is determined in step S10 that the lane change has been completed (step S10: YES), then after the elapse of a certain time period, the process returns to step S1.

On the other hand, if it is determined in step S7 that the lane change is difficult to perform (step S7: YES), the process proceeds to step S11 of FIG. 6, and a takeover request (TOR) with respect to the driver to take over the responsibility for manual driving is performed.

Figure 6:
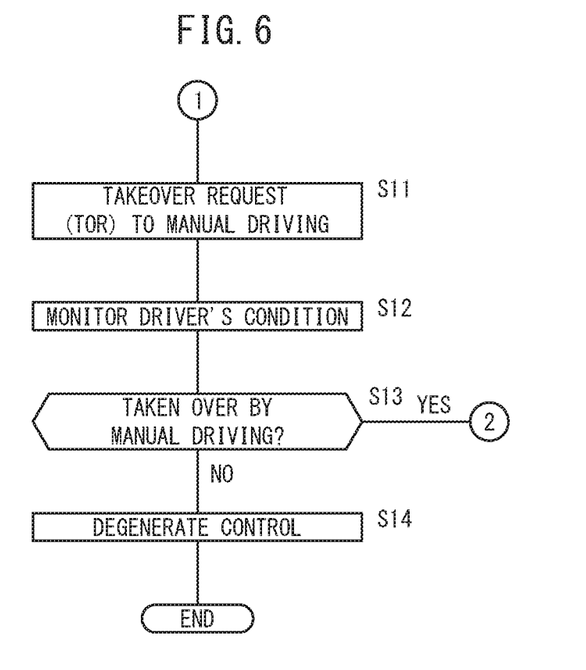
FIG. 6 is a flowchart (second part thereof) showing processing operations of the vehicle control device according to the present embodiment.

Thereafter, in step S12, monitoring is performed as to whether or not taking over of manual driving by the driver has been completed, and operations of the steering wheel or operations of the accelerator pedal, as well as the state of the driver are monitored (the state of the driver is confirmed with a camera provided in the vehicle cabin).

In the case it is detected in step S13 that the driver has executed manual driving or is in a state capable of executing manual driving (step S13: YES), the automated driving mode is terminated and taking over by manual driving is implemented. When switching over to manual driving in step S13 on the basis of the TOR in step S11, the steering wheel may be operated completely manually by the driver. Further, with a driving assist for an automatic lane change, for example, on the basis of a blinker operation by the driver, a lane change into the passing lane 106 where the branching path 110 or the merging path 112 exists may be started and executed. Thereafter, following the elapse of a predetermined time period, the process returns to step S1 of FIG. 5.

Moreover, inclusion of the automatic lane change is because, since the lane change is performed by way of the driver operating the turn signal as a trigger, in the automated driving where a large portion has been automated, even at a timing at which it is difficult to perform a lane change, it may also be considered possible for the driver to carry out the lane change at the correct timing.

If it is determined in step S13 that the driver has not taken over the responsibility for driving, even though the driver has traveled a predetermined distance after having received the TOR, or a predetermined time period has elapsed after having received the TOR, the process proceeds to step S14, and a degenerate control is executed. In the degenerate control, the hazard lamp is turned on and the vehicle is stopped or a stopped state of the vehicle is maintained by automatic braking. Further, when the vehicle is stopped, at least one of the actions of causing the vehicle to approach the road shoulder by a steering control, or making a lane change from the passing lane to the travel lane of an expressway is performed.

Figure 5:
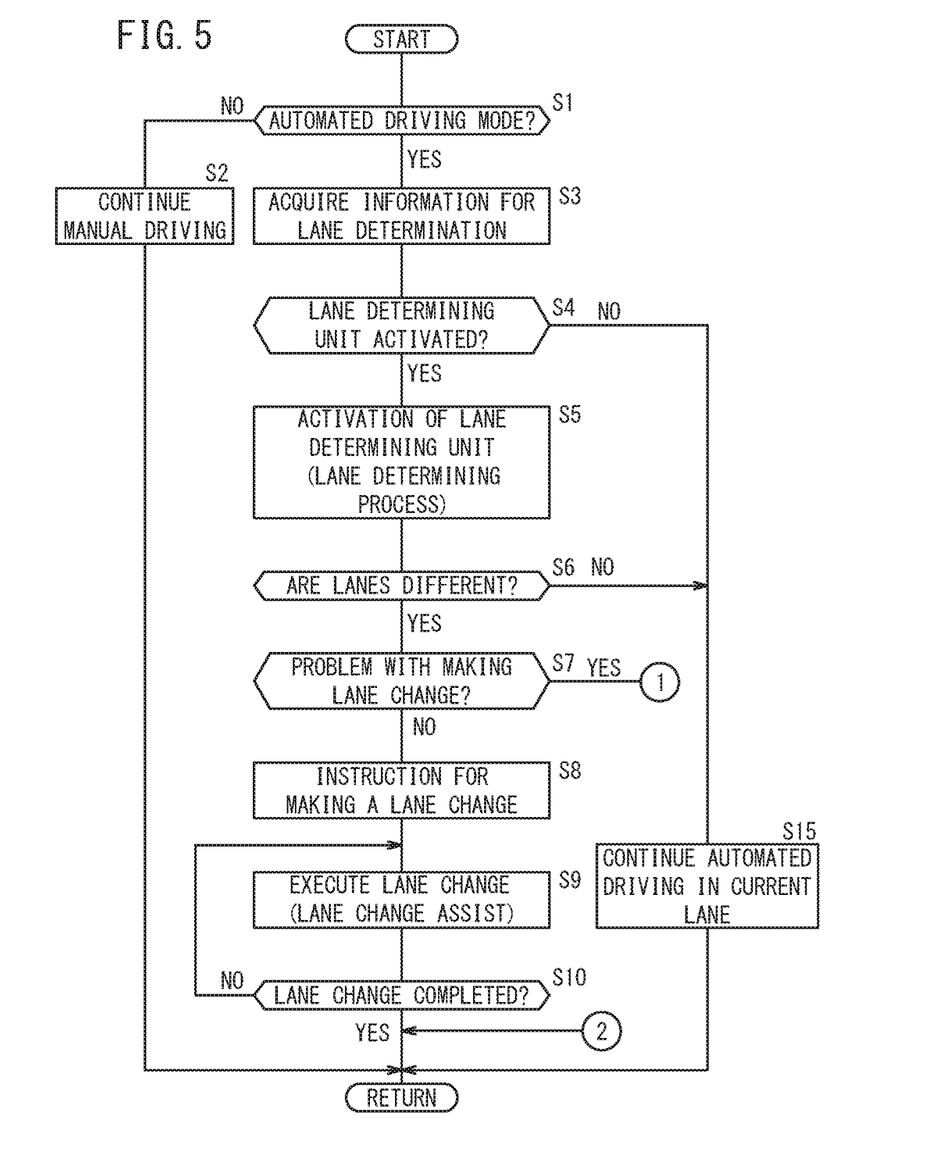
FIG. 5 is a flowchart (first part thereof) showing processing operations of the vehicle control device according to the present embodiment.

In the case it is determined as a result of the lane determination in step S6 of FIG. 5 that the lane in which the host vehicle is traveling and the lane in which the branching path or the merging path into which entry is planned exist are the same (step S6: NO), or if it is determined in step S4 that the current time is not at a timing for the lane determining unit 64 (step S4: NO) to be activated, then the lane determining unit 64 proceeds to step S15, and traveling by way of automated driving in the current lane is continued. Thereafter, following the elapse of a predetermined time period, the process returns to step S1.

As described above, the vehicle control device 10 according to the present embodiment is adapted to automatically control traveling of the host vehicle 100 at least partially, and includes the lane determining unit 64 which, in the event there is a branching path 110 or a merging path 112 in a planned travel route 102 for the host vehicle 100, determines (lane determination) whether or not a lane in which the host vehicle 100 is traveling differs from a lane in which the branching path 110 or the merging path 112 exists, and the lane change instructing unit 68 which, in the event it is determined by the lane determining unit 64 that the lane in which the host vehicle 100 is traveling differs from the lane in which the branching path 110 or the merging path 112 exists, sets a route so that the host vehicle 100 automatically performs a lane change into the lane in which the branching path 110 or the merging path 112 exists.

In accordance with this feature, it is possible to enhance merchantability in relation to automated driving, as well as to carry out a lane change while continuing with automated driving insofar as possible, even before reaching the branching path 110 or the merging path 112.

In the present embodiment, the lane determining unit 64 may perform the determination at a point in time when the host vehicle 100 has reached a predetermined distance in front of the branching path 110 or the merging path 112, or at a point in time when the host vehicle 100 has reached a predetermined time period before a point in time at which the host vehicle 100 reaches the branching path 110 or the merging path 112.

In accordance with this feature, for example, in the case that traffic congestion has occurred in the branching path 110 or the merging path 112, it is possible for the host vehicle 100 to make a lane change beforehand into the lane in which the branching path 110 or the merging path 112 exists.

In the present embodiment, the host vehicle 100 may include the traffic congestion information receiving unit (communications device 16) which receives traffic congestion information by way of communications, and the lane determining unit 64 may perform the determination when the traffic congestion information is updated.

In accordance with this feature, in the case that traffic congestion has occurred in the branching path 110 or the merging path 112, it is possible for the host vehicle 100 to make a lane change beforehand into the lane in which the branching path 110 or the merging path 112 exists. Of course, if no traffic congestion is occurring, automated driving may be continued in accordance with the preset action plan.

In the present embodiment, the lane determining unit 64 may perform the determination when the planned travel route 102 of the host vehicle 100 is changed.

In accordance with this feature, accompanying a change in the branching path 110 or the merging path 112 that was targeted, it is determined whether or not the lane in which the host vehicle 100 is traveling differs from the lane in which the branching path 110 or the merging path 112 after having been changed exists. Stated otherwise, even if the planned travel route 102 of the host vehicle 100 is changed, the timing of the lane change is set appropriately in accordance with the change in the travel route, so that automated driving can be continued for a longer time, and merchantability in relation to automated driving can further be enhanced.

In the present embodiment, for a case in which a travel lane 104 and a passing lane 106 exist in the planned travel route 102 of the host vehicle 100, and the branching path 110 is present in the planned travel route 102 of the host vehicle 100, in the case it is determined that the host vehicle 100 is traveling in the travel lane 104 and the branching path 110 exists in the passing lane 106, the lane determining unit 64 may set an action plan for changing the lane of the host vehicle 100 to the passing lane 106 in the planned travel route 102, and may continue with automated driving.

In accordance with this feature, while the host vehicle 100 is traveling in the travel lane 104, and for example, in the case that traffic congestion has occurred in front of the host vehicle in a branching path 110 that exists on the side of the passing lane 106, it is possible for the host vehicle 100 to make a lane change beforehand into the passing lane 106.

In the present embodiment, the host vehicle 100 may include the traffic congestion information receiving unit (communications device 16) which receives traffic congestion information by way of communications. Further, the lane determining unit 64 may include the vehicle control unit 60 that automatically controls the host vehicle 100 so as to behave in a manner to facilitate lane changing, at a point in time when the host vehicle 100 has reached a predetermined distance in front of the branching path 110 or the merging path 112, or at a point in time when the host vehicle 100 has reached a predetermined time period before a point in time at which the host vehicle 100 reaches the branching path 110 or the merging path 112, and in the case it is predicted by the traffic congestion information receiving unit that the branching path 110 or the merging path 112 is in a congested state.

In accordance with this feature, by the automated driving behaving in a manner to facilitate lane changing, it is possible to easily perform a lane change automatically, prior to reaching a location where traffic congestion is occurring.

In the present embodiment, in the case it is predicted that the branching path 110 or the merging path 112 is in a congested state, the vehicle control unit 60 may decrease or increase any one of a vehicle velocity, an acceleration, a deceleration, and a steering amount of the host vehicle, as compared with a condition thereof prior to predicting the congested state.

In accordance with this feature, it becomes easier to make a lane change, and to facilitate stopping at the tail end of the traffic congestion after having made the lane change. The reason why the term "increase" is included is because it may be easier in certain cases to make a lane change by accelerating or the like.

The present invention is not limited to the embodiment described above, and it goes without saying that the present invention can be freely modified within a range that does not depart from the essence and gist of the present invention.

Figure 7:
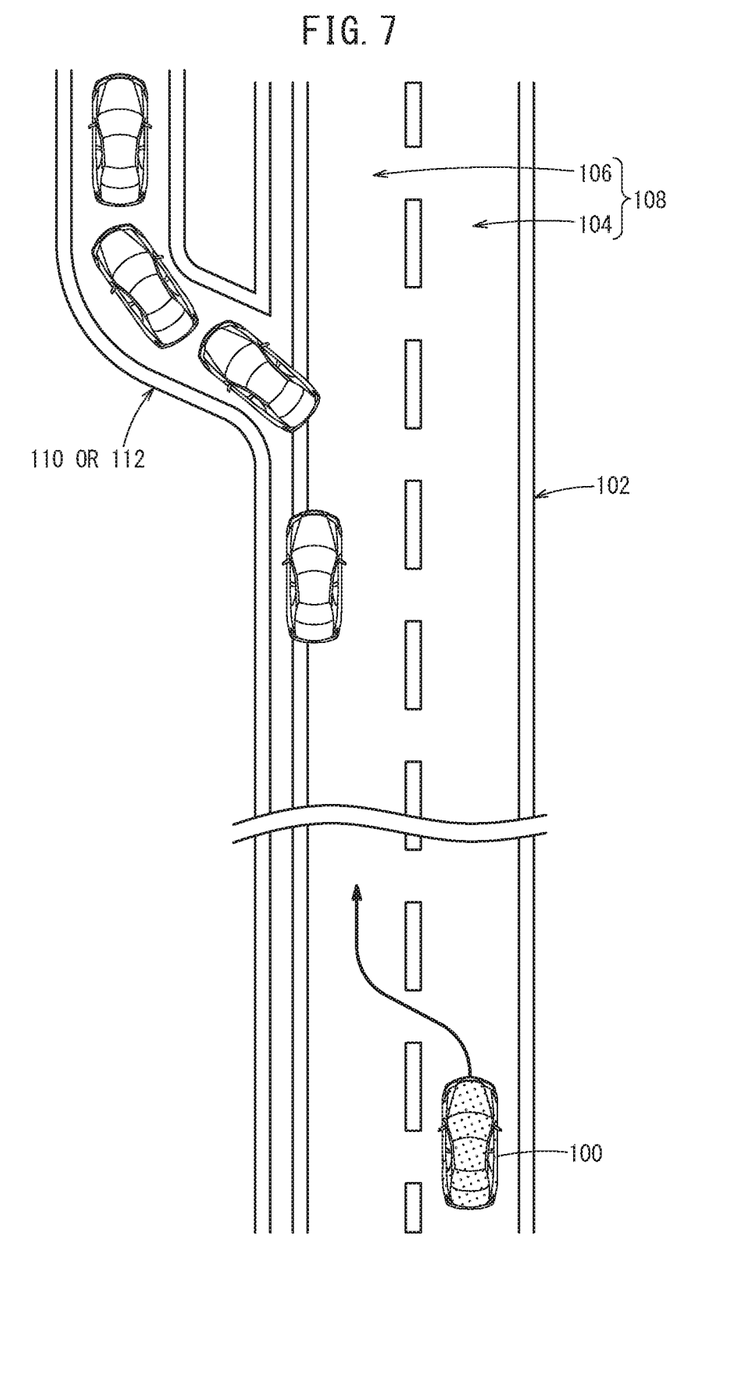
FIG. 7 is an explanatory diagram showing an example in which a branching path or a merging path exists on the side of a travel lane, from within a main line of an expressway having both a travel lane and a passing lane.

For example, as shown in FIG. 7, in the case that the lane determining unit 64 has determined that the host vehicle 100 is traveling in the passing lane 106, and the branching path 110 or the merging path 112 exists in the travel lane 104, then in the planned travel route 102, an action plan that causes the host vehicle 100 to make a lane change into the travel lane 104 may be set, and automated driving may be continued.

At this time, in the event that the distance over which traffic congestion is occurring in the branching path 110 or the merging path 112 is long, it is conceivable that the congested vehicles within the branching path 110 or the merging path 112 cannot be accommodated therein, and thus the vehicles overflow and become congested in the normal travel lane 104.

Figure 8A:
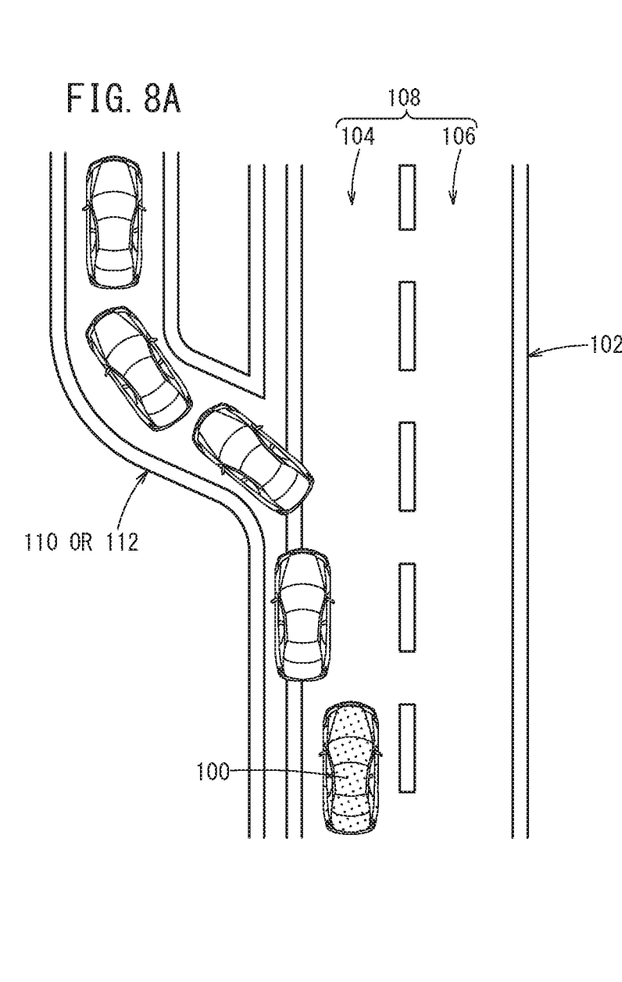
FIG. 8A is an explanatory diagram showing a state in which the host vehicle is waiting for traffic congestion in proximity to the center of a lane, in accordance with a road departure mitigation control.

In such a situation, as shown in FIG. 8A, it is normal for several vehicles to remain waiting in the traffic congestion in proximity to a road shoulder area of the travel path. However, in the case of automated driving, basically a control is performed to travel in the vicinity of the center of the lane, and in accordance with a road departure mitigation control, the vehicle is controlled so as not to deviate outside of the lane.

Therefore, in the above-described scenario, concerning a case in which the host vehicle 100 is also at a tail end of the traffic congestion, there is a fear that the host vehicle 100 will remain waiting for the traffic congestion in the center of the lane, and thereby hinder the traffic behind the host vehicle 100 from traveling straight ahead.

Figure 8B:
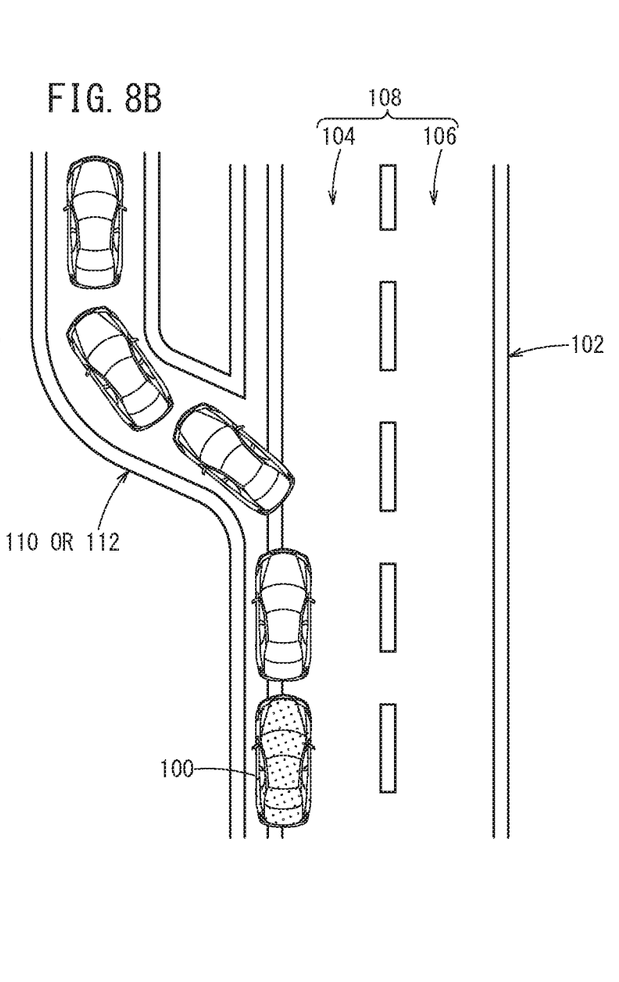
FIG. 8B is an explanatory diagram showing a state in which the host vehicle is waiting for traffic congestion on the side of a road shoulder, in accordance with alleviation of the road departure mitigation control.

Thus, as shown in FIG. 8B, in the case that the length of the traffic congestion is expected to exceed the length of the branching path 110 or the merging path 112, then when the host vehicle 100 arrives at the tail end of the traffic congestion, and during automated driving, or in a driving assist action that is operated during automated driving, the road departure mitigation control may be alleviated, and thereby allow the host vehicle 100 to be brought in proximity to the side of the road shoulder. Consequently, it becomes possible to wait for the traffic congestion without obstructing the traffic behind the host vehicle.

Further, in the examples of FIGS. 3 and 4, while the host vehicle 100 is traveling in the travel lane 104, and for example, in the case that traffic congestion has occurred in front of the host vehicle 100 in a branching path 110 or a merging path 112 that exists on the side of the passing lane 106, the host vehicle 100 is controlled to make a lane change beforehand into the passing lane 106. Further, in the example of FIG. 7, while the host vehicle 100 is traveling in the passing lane 106, and for example, in the case that traffic congestion has occurred in front of the host vehicle 100 in a branching path 110 or a merging path 112 that exists on the side of the travel lane 104, the host vehicle 100 is controlled to make a lane change beforehand into the travel lane 104.

Before the lane change or after the lane change is made in the manner described above, in the case it is anticipated that traffic congestion is occurring due to waiting to branch or merge, and that such traffic congestion extends beyond the length of the branching path 110 or the merging path 112, the route in the action plan may be rewritten and changed to a route that avoids the branching path 110 or the merging path 112. At this time, permission may be sought from the driver as to whether the route may be changed before reaching the branching path 110 or the merging path 112.

In accordance with this feature, since a special automated driving control to have the vehicle be brought in to proximity to the road shoulder is not performed, it is possible to avoid a scenario in which it becomes difficult to execute automated driving, continuing with automated driving is facilitated, and thus the commercial value as a vehicle that performs automated driving can be enhanced.

The present invention is applicable to a case in which a vehicle travels on the right side of the road.

What is claimed is:

1. A vehicle control device which automatically controls traveling of a host vehicle at least partially, comprising:
   a lane determining unit which, in the event there is a branching path or a merging path in a planned travel route of the host vehicle, determines whether or not a lane in which the host vehicle is traveling differs from a lane in which the branching path or the merging path exists; and
   a lane change instructing unit which, in the event it is determined by the lane determining unit that the lane in which the host vehicle is traveling differs from the lane in which the branching path or the merging path exists, sets a route so that the host vehicle automatically performs a lane change into the lane in which the branching path or the merging path exists,
   wherein the lane change instructing unit requests a driver for a takeover operation to manual driving in the event it is determined that the automatic lane change is difficult, and
   after requesting the takeover operation, the lane change instructing unit determines whether the driver has completed the takeover operation by monitoring at least one of a steering wheel, an acceleration pedal and a state of the driver, and implements a stopping control to stop the host vehicle in the event it is determined that the takeover operation has not completed.

2. The vehicle control device according to claim 1, wherein the lane determining unit performs the determination at a point in time when the host vehicle has reached a predetermined distance in front of the branching path or the merging path, or at a point in time when the host vehicle has reached a predetermined time period before a point in time at which the host vehicle reaches the branching path or the merging path.

3. The vehicle control device according to claim 1, wherein:
   the host vehicle comprises a traffic congestion information receiving unit receives traffic congestion information by way of communications; and
   the lane determining unit performs the determination when the traffic congestion information is updated.

4. The vehicle control device according to claim 1, wherein the lane determining unit performs the determination when the planned travel route of the host vehicle is changed.

5. The vehicle control device according to claim 1, wherein:
   for a case in which a travel lane and a passing lane exist in the planned travel route of the host vehicle, and the branching path is present in the planned travel route of the host vehicle,
   in the case it is determined that the host vehicle is traveling in the travel lane and the branching path exists in the passing lane, the lane determining unit sets an action plan for changing the lane of the host vehicle to the passing lane in the planned travel route, and continues with automated driving.

6. The vehicle control device according to claim 1, wherein:
   the host vehicle comprises a traffic congestion information receiving unit receives traffic congestion information by way of communications; and
   the lane determining unit comprises a vehicle control unit which automatically controls the host vehicle so as to behave in a manner to facilitate lane changing, at a point in time when the host vehicle has reached a predetermined distance in front of the branching path or the merging path, or at a point in time when the host vehicle has reached a predetermined time period before a point in time at which the host vehicle reaches the branching path or the merging path, and in the case it is predicted by the traffic congestion information receiving unit that the branching path or the merging path is in a congested state.

7. The vehicle control device according to claim 6, wherein, in the case it is predicted that the branching path or the merging path is in a congested state, the vehicle control unit decreases or increases any one of a vehicle velocity, an acceleration, a deceleration, and a steering amount of the host vehicle, as compared with a condition thereof prior to predicting the congested state.

8. The vehicle control device according to claim 1, further comprising:
- a road departure mitigation control unit which performs a road departure mitigation control for suppressing departure of the host vehicle from the road, at least when the host vehicle is made to undergo automated traveling along the road; and
- the host vehicle includes a traffic congestion information receiving unit receives traffic congestion information by way of communications;
- wherein, at a point in time when the host vehicle has reached a predetermined distance in front of the branching path or the merging path, or at a point in time when the host vehicle has reached a predetermined time period before a point in time at which the host vehicle reaches the branching path or the merging path; and
- in the case it is determined by the lane determining unit, on the basis of the information received by the traffic congestion information receiving unit, that a traffic congestion distance is longer than a length of the branching path or the merging path;
- the road departure mitigation control by the road departure mitigation control unit is alleviated.

9. The vehicle control device according to claim 1, comprising:
- a travel route setting unit which sets a travel route of the host vehicle; and
- a traffic congestion information receiving unit which receives traffic congestion information by way of communications;
- wherein, at a point in time when the host vehicle has reached a predetermined distance in front of the branching path or the merging path, or at a point in time when the host vehicle has reached a predetermined time period before a point in time at which the host vehicle reaches the branching path or the merging path; and
- in the case it is determined by the lane determining unit, on the basis of the information received by the traffic congestion information receiving unit, that a traffic congestion distance is longer than a length of the branching path or the merging path;
- the travel route setting unit changes the travel route so as to avoid the branching path or the merging path.

* * * * *